(12) United States Patent
Whiteside et al.

(10) Patent No.: US 11,907,144 B1
(45) Date of Patent: Feb. 20, 2024

(54) EARLY SEMAPHORE UPDATE

(71) Applicant: Amazon Technologies, Inc., Seattle, WA (US)

(72) Inventors: Raymond S. Whiteside, Austin, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 70 days.

(21) Appl. No.: 17/805,410

(22) Filed: Jun. 3, 2022

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC .............................. G06F 13/28; G06F 2213/28
See application file for complete search history.

(56) References Cited

U.S. PATENT DOCUMENTS 11,221,979 B1 * 1/2022 Borkovic ............... G06N 3/045

* cited by examiner

*Primary Examiner* — Idriss N Alrobaye
*Assistant Examiner* — Ronald T Modo
(74) *Attorney, Agent, or Firm* — Weaver Austin Villeneuve & Sampson LLP

(57) ABSTRACT

Techniques to reduce the latency in notifying that space in a memory has been freed up are described. For example, when moving data from on-chip memory of a computing engine to system memory, the computing engine can be notified that its on-chip memory is free before an acknowledgment is provided by the system memory that the data being moved has been written into the system memory. The computing engine can be given access to the on-chip memory sooner by generating an early semaphore update based on a determination that the set of data being moved to system memory has been read out from the on-chip memory. The early semaphore update need not wait for the acknowledgement from the system memory, thus reducing the latency of notifying the computing engine that the on-chip memory is free.

20 Claims, 9 Drawing Sheets

EARLY SEMAPHORE UPDATE

BACKGROUND

A computer system may include processors, accelerators, input/output (I/O) devices, internal memory devices, external memory devices, and other suitable components to communicate with one another via one or more interconnects. The computer systems may also include direct memory access (DMA) engines to transfer data between different components of the computer system. DMA transfers can perform data transfer between components of the system without involving the host processor to improve memory access latency and free up the host processor to perform other tasks.

BRIEF DESCRIPTION OF THE DRAWINGS

Various embodiments in accordance with the present disclosure will be described with reference to the drawings, in which.

DETAILED DESCRIPTION

Figure 1:
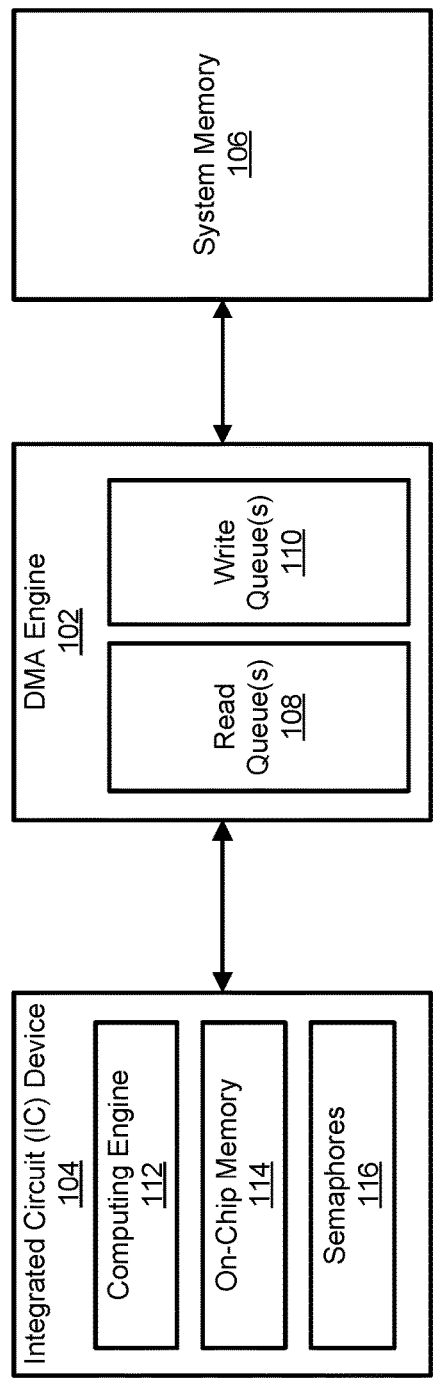
FIG. 1 illustrates a block diagram of an example of a computing system.

In a computer system, direct memory access (DMA) engines are generally used to off-load data transfer operations from a host processor to improve system performance. In some implementations, the DMA engine may perform data transfer between different components of the computer system based on DMA descriptors. The DMA descriptors may include various parameters associated with the data transfer such as an address (e.g., source address for read, target address for write) and a data transfer size, which can be programmed by the software executing on a host processor of the computer system. When transferring a set of data from a source device to a destination device, the DMA engine may read the set of data from the source device based on the read descriptors, temporarily store the set of data in a data buffer in the DMA engine, and then transfer the set of data from the data buffer to the destination device based on the write descriptors. The DMA engine may include one or more queues. Each queue may include a descriptor queue pair having a read descriptor queue to store the read descriptors for reading the set of data from the source device, and a write descriptor queue to store the write descriptors for writing the set of data to the destination device. Each descriptor queue operates as a FIFO and provides a stream of descriptors for the DMA engine to process. Descriptors placed in a descriptor queue are processed sequentially. Each queue (including the read descriptor queue and the write descriptor queue) can be thought of as a data movement thread, and each queue can be processed independently from other queues in the DMA engine. The number of DMA queues, data buffers, and the descriptors used for different read and write operations may vary based on the implementation.

In some systems, the DMA engine can be used to transfer data from on-chip memory to a system memory (e.g., dynamic random access memory (DRAM), high-bandwidth memory (HBM), etc.). A computing engine may perform multiple data computations over time and the results of the computations can be stored in the on-chip memory as they become available. However, when the on-chip memory is full and a new set of data has to be stored in the on-chip memory, the set of data already stored in the on-chip memory may have to be transferred to the system memory to free up the on-chip memory. For example, space in the on-chip memory may be needed to store intermediate results which are used in subsequent computations.

In some implementations, semaphores can be used for communication between the computing engine and the DMA engine to synchronize various data transfer operations. As an example, the computing engine may wait for a certain event (e.g., a semaphore update) to indicate that the set of data has been transferred from the on-chip memory to the system memory, and the on-chip memory is available to store the next set of data. A semaphore can be implemented as a counter, and the value of the counter can be used to indicate certain events have occurred. The DMA engine used for transferring the set of data from the on-chip memory to the system memory may update the semaphore when the DMA engine has received an acknowledgement from system memory to indicate that the data has been successfully stored and the on-chip memory is available to store the next set of data. For example, the DMA engine may process a semaphore update descriptor having a memory barrier that waits for the acknowledgement before writing to the semaphore. The computing engine may wait for the updated semaphore before writing the next set of data into the on-chip memory.

Thus, even after the set of data has been read from the on-chip memory and stored in the data buffer of the DMA engine, the computing engine may not be aware that the on-chip memory is available until the previous set of data has been transferred from the data buffer in the DMA engine into the system memory. This is because the semaphore is not updated until an acknowledgement has been received from the system memory indicating that the set of data has been committed to the system memory. The latency incurred during the transfer of the previous set of data from the DMA data buffer to the system, as well as the wait for the acknowledgement from the system memory may adversely affect system performance because the computing engine may be idle during this time while waiting for availability in the on-chip memory.

The techniques described herein can be used to reduce the latency in the datapath by enabling the computing engine to store a new set of data in the on-chip memory once the previously stored set of data has been read out from the on-chip memory. The computing engine can be notified that the on-chip memory is free before an acknowledgment is provided by the system memory, and in some instances, before the data has been completely written into the system memory. The computing engine can be given access to the on-chip memory sooner by generating an early semaphore update based on a determination that the set of data stored in the on-chip memory has been read out. The early semaphore update need not wait for the acknowledgement from the system memory. Separate semaphores or different values of the same semaphore can be used to differentiate between: (1) the indication that the set of data has been read from the on-chip memory and the on-chip memory is free to store the new set of data; and (2) that the set of data has been stored in the system memory and can be accessed from the system memory.

In some embodiments, once the set of data has been read out from the on-chip memory and has been buffered in the DMA engine, a first semaphore update can be performed to indicate that the on-chip memory is free to store the new set of data. The computing engine may detect the updated first semaphore and initiate writing the new set of data into the on-chip memory. Once the set of data buffered in the DMA engine has been transferred to the system memory, the system memory may send the acknowledgement indicating that the set of data has been successfully stored in the system memory. The DMA engine may perform a second semaphore update based on the acknowledgement to indicate to the computing engine that the set of data is available in the system memory. In some implementations, a single semaphore location can be updated by the two semaphore updates, and the computing engine may wait for different values of that semaphore to perform corresponding actions.

The first semaphore update can be inserted into the processing flow using various implementations. In some implementations, a first semaphore update descriptor without a memory barrier can be inserted in the write descriptor queue immediately after the last write descriptor and before a second semaphore update descriptor with the memory barrier. The first semaphore update descriptor without the memory barrier may cause the first semaphore update to occur immediately after the last write descriptor has been processed without waiting for an acknowledgment from system memory. The second semaphore update descriptor with the memory barrier may cause the second semaphore update to occur after receiving an acknowledgment from the system memory.

In some implementations, the first semaphore update descriptor without a memory barrier can be stored in another queue in the DMA engine, which can be triggered by incrementing a tail pointer after the last read of the on-chip memory corresponding to the last read descriptor has been performed. Because each queue is processed independently, by placing the first semaphore update descriptor in a separate queue, the first semaphore update need not wait until all the write descriptors have been processed. This may allow the first semaphore update to occur sooner, for example, in instances where the write descriptor queue is unable to process the write descriptors fast enough due to congestion or other latencies.

In some implementations, the first semaphore update can be inserted by semaphore update generator circuitry after detecting that a last read of the on-chip memory has been performed. The semaphore update generator circuitry may snoop the input interface and detect that the last read has occurred when a read response for the last read has been received by the DMA engine (e.g., a last data element of the set of data has been received by the DMA engine). The semaphore update generator circuitry may generate a semaphore update transaction, and bypass the descriptor queues in the DMA engine by pushing the semaphore update transaction into the output interface of the DMA engine.

Thus, various implementations can be used to perform the first semaphore update without the memory barrier before the second semaphore update having the memory barrier. Such a semaphore update technique may allow the computing engine to write the new set of data into the on-chip memory even before an acknowledgment has been received from the system memory indicating the original data transfer has been completed. The early update of the first semaphore can optimize the data transfer operations from the on-chip memory to the system memory, and allow the computing engine to use the on-chip memory for the next set of computations with minimal delay to improve performance.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a system 100 operable to optimize data transfer operations between a system memory 106 and an integrated circuit (IC) device 104 using an early semaphore update. System 100 may include a direct memory access (DMA) engine 102 operable to perform data transfer operations between IC device 104 and system memory 106. System 100 may include other components based on the functionalities supported by the system. For example, system 100 may also include a host processor to execute software to configure and manage different components. In some implementations, different components of system 100 may communicate with one another via one or more interconnects. In some cases, system 100 can be used for machine learning applications to provide services including image recognition, natural language processing, video processing, or text-based queries, among other examples.

IC device 104 may include a computing engine 112, an on-chip memory 114, and one or more semaphores 116. In some examples, computing engine 112 may be configured to perform different computations on input data stored in on-chip memory 114, and store the results of the computations back into on-chip memory 114. As an example, the computing engine 112 may include a neural network processor, which may perform neural network computations on an input dataset (e.g., input feature maps) with weight values to generate an output dataset. For instance, the input dataset may include data associated with an image that needs to be classified, and the output dataset may include intermediate data associated with an intermediate layer of a neural network. The computing engine 112 may store the intermediate data in the on-chip memory 114 for subsequent computations to generate the final results. In some examples, the on-chip memory 114 can be used to store weight values and/or input feature maps for the execution of a neural network.

System memory 106 is operable to store sets of data associated with IC device 104, and other suitable data. System memory 106 cab be implemented using DRAMs, SDRAMs, DDR SDRAMs, or another type of memory device. In some implementations, system memory 106 can include high bandwidth memory (HBM), which may include vertically stacked DRAM chips. The on-chip memory 114 may include SRAM, or other type of suitable memories. The on-chip memory 114 may have a smaller capacity as compared to system memory 106. In some cases, on-chip memory 114 may be used as a cache to store the set of data associated with the computations performed by the computing engine 112.

Semaphores 116 may include one or more semaphores, and each semaphore can be implemented as a counter using flip-flops or other suitable storage. Each semaphore may act as an event register. In some implementations, the computing engine 112 may wait for a certain value of a semaphore to perform a specific action. For example, the computing engine 112 may wait for a semaphore to reach a specific value before storing a new set of data in the on-chip memory 114. In some implementations, the semaphore may be updated to that specific value by the DMA engine 102 when the on-chip memory 114 is available to store the new set of data.

The DMA engine 102 may include one or more read descriptor queues 108 and one or more write descriptor queues 110. The read descriptor queue 108 may store read descriptors for performing read operations, and the write descriptor queue 110 may store write descriptors for performing write operations. For example, the read descriptor queue 108 may store the read descriptors for reading the set of data from the on-chip memory 114, and the write descriptor queue 110 may store the write descriptors for writing the set of data read from the on-chip memory 114 to the system memory 106. In some implementations, the DMA engine 102 may temporarily transfer the set of data read from the on-chip memory 114 into a data buffer (not shown), and then from the data buffer to the system memory 106. The data buffer can be part of the DMA engine 102. An example data transfer operation using the read descriptor queue 108 and the write descriptor queue 110 is described with reference to FIG. 2.

Figure 2:
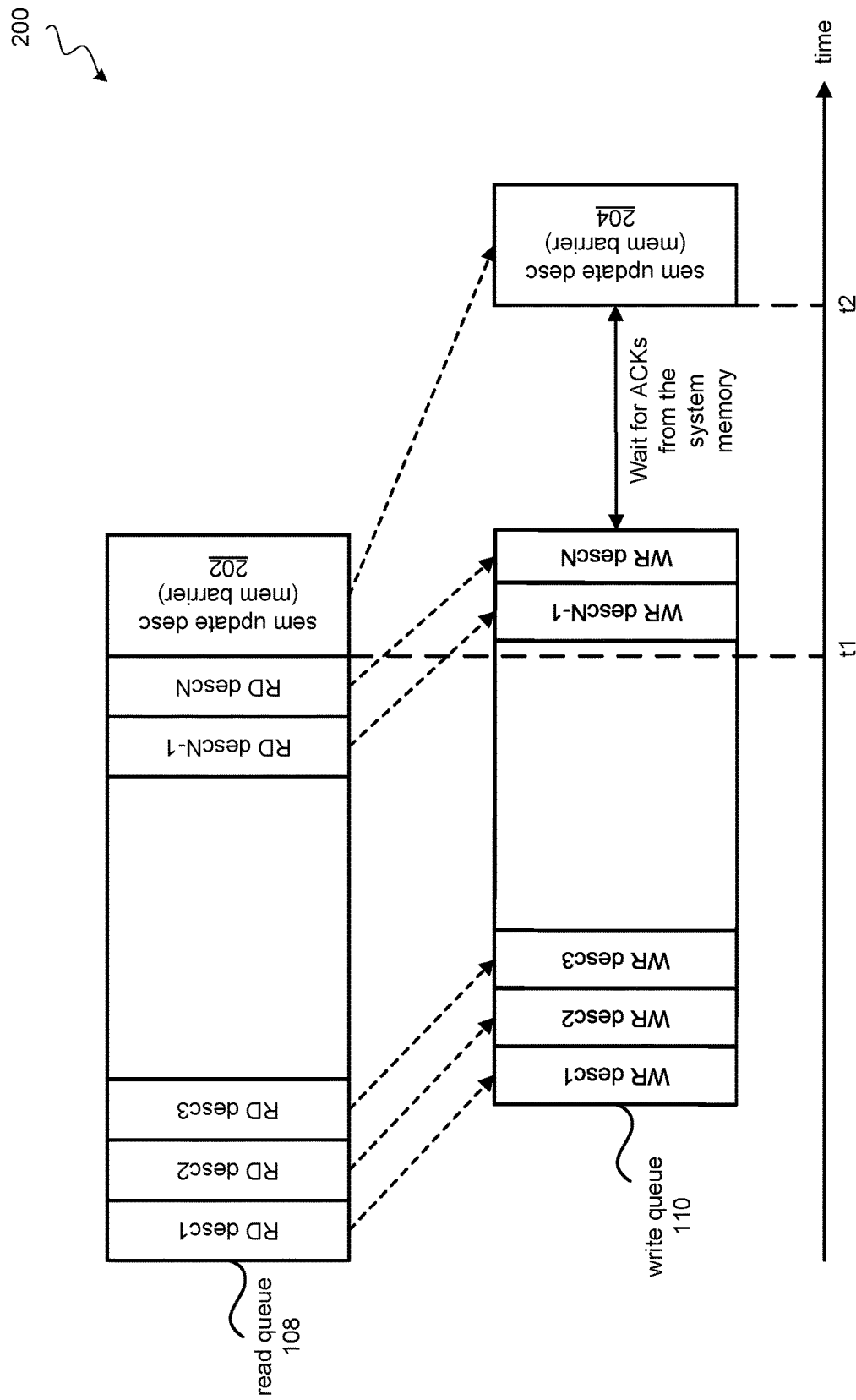
FIG. 2 illustrates a timing diagram of an example of data transfer operations performed by a direct memory access (DMA) engine.

FIG. 2 illustrates a timing diagram 200 of an example of data transfer operations performed by the DMA engine 102. In some examples, the read descriptor queue 108 can be programmed with N read descriptors including a RD desc1, a RD desc2, a RD desc3, a RD descN−1, and a RD descN for reading corresponding N data elements of a set of data from the on-chip memory 114. The write descriptor queue 110 can be programmed with N write descriptors including a WR desc1, a WR desc2, a WR desc3, a WR descN−1, and a WR descN for writing the corresponding N data elements of the set of data read from the on-chip memory 114 to the system memory 106. Each of the N read descriptors may include a source address, and each of the N write descriptors may include a corresponding target address. Each descriptor may also include the number of data elements to be transferred, a size of each data element, a data transfer type, and/or other suitable attributes.

The DMA engine 102 may transfer each of the N data elements of the set of data from the on-chip memory 114 to the system memory 106 over time based on the corresponding N read descriptors and the N write descriptors. For example, the DMA engine 102 may perform a read of a first data element from the on-chip memory 114 based on the first read descriptor (or RD desc1) followed by a write of the first data element to the system memory 106 based on the WR desc1 (or WR desc1). In this manner, all the N data elements of the set of data may be transferred from the on-chip memory 114 to the system memory 106 over a certain time window. In some implementations, the DMA engine 102 may transfer each data element of the set of data read from the on-chip memory 114 to a data buffer in the DMA engine 102 based on the corresponding read descriptors, and from the data buffer to the system memory 106 based on the corresponding write descriptors.

The read descriptor queue 108 may also store a semaphore update descriptor (or sem update desc) 202 with a memory barrier after the RD descN, and the write descriptor queue 110 may also store a corresponding semaphore update descriptor (or sem update desc) 204 with a memory barrier after the WR descN. The memory barrier may correspond to waiting for an acknowledgement from the system memory 106, which is received after all the N data elements have been successfully written into system memory 106. The semaphore update descriptor 202 in the read descriptor queue 108 is used to obtain or generate a value for updating the semaphore (e.g., to increment the semaphore by 1). The semaphore update descriptor 204 in the write descriptor queue 110 may then apply this value to perform the semaphore update. The semaphore update descriptor 204 has a memory barrier that waits for an acknowledgment from system memory indicating the writes corresponding to descriptors WR desc1 through WR descN have been completed, before performing the semaphore update.

Meanwhile, the computing engine 112 may be waiting for the updated value of the semaphore to indicate that the on-chip memory 114 is free to store a new set of data. When the computing engine 112 detects the updated semaphore, the computing engine 112 can write the new set of data into the on-chip memory 114. However, due to the memory barrier for the semaphore update, even after all the N data elements of the set of data have been read out from the on-chip memory 114 at time T1, the semaphore may not be updated until a later time T2 when the acknowledgement is received from the system memory 106. In some implementations, a respective acknowledgment may be received for each data element of the set of data after it has been written into system memory 106. In such scenarios, the semaphore may not be updated until the last acknowledgment corresponding to the last data element has been received. Thus, updating the semaphore based on a memory barrier can cause unnecessary latency and affect the performance of the computing engine 112.

Figure 3:
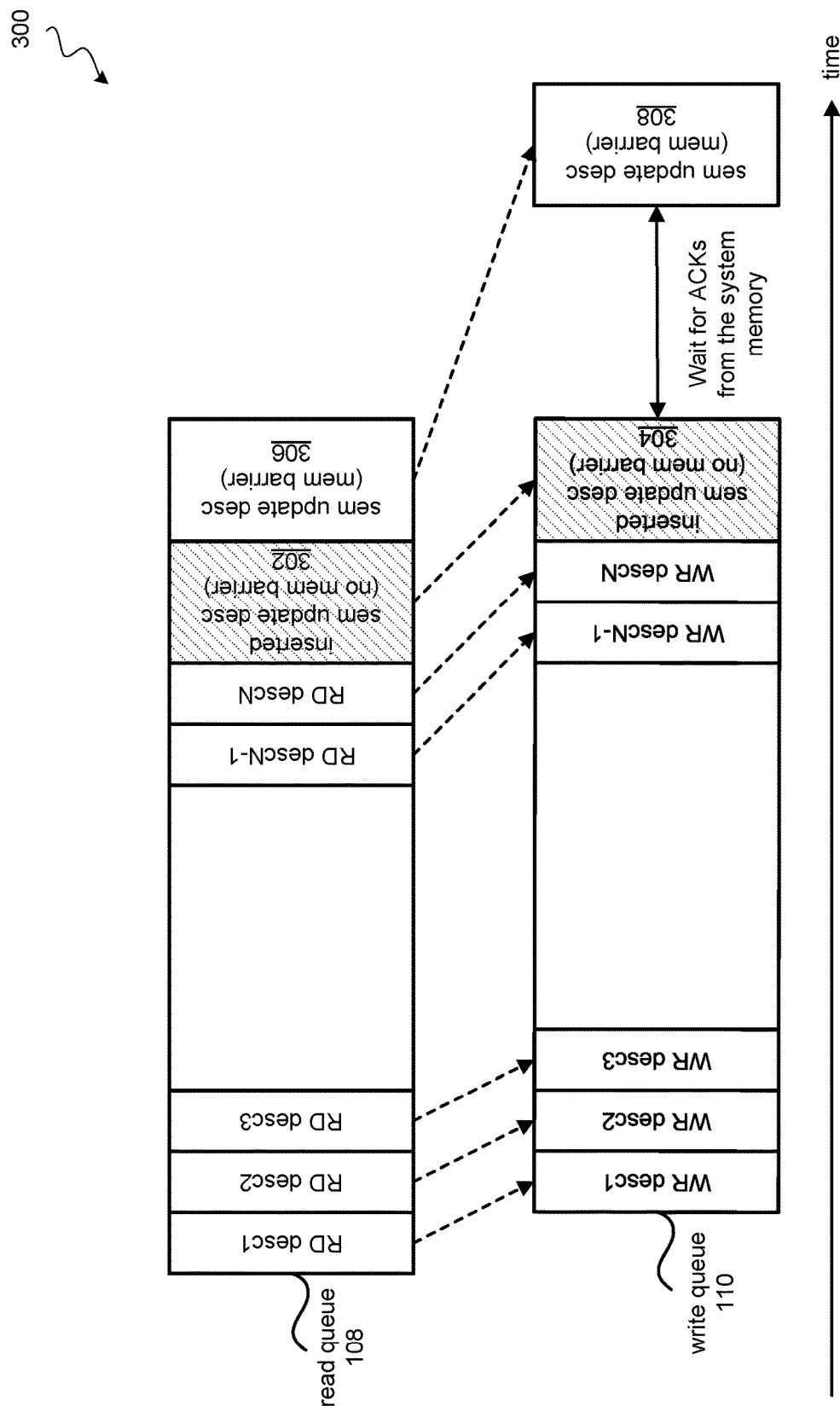
FIG. 3 illustrates a timing diagram of another example of data transfer operations performed by a DMA engine.

FIG. 3 illustrates a timing diagram 300 of another example of data transfer operations performed by the DMA engine 102. In the implementation of FIG. 3, a semaphore update descriptor without a memory barrier can be inserted before a semaphore update descriptor with a memory barrier to indicate to the computing engine 112 that the set of data has been read out from the on-chip memory 114. As shown in FIG. 3, a semaphore update descriptor 302 can be inserted before semaphore update descriptor 306 in the read descriptor queue 108, and a corresponding semaphore update descriptor 304 without a memory barrier can be inserted in the write descriptor queue 110 before semaphore update descriptor 308 with a memory barrier. The second semaphore update descriptor 306 is similar to semaphore update descriptor 202, and the second semaphore update descriptor 308 is similar to the semaphore update descriptor 204. These second semaphore update descriptors are used to indicate the set of data has been successfully written into system memory.

Referring to FIG. 3, the inserted semaphore update descriptor 302 can be inserted right after the RD descN in read descriptor queue 108, and the inserted semaphore update descriptor 304 without the memory barrier can be inserted right after the WR descN in write descriptor queue 110 to perform a first semaphore update as soon as the last write descriptor WR descN has been processed. The inserted semaphore update descriptor 302 in read descriptor queue 108 may cause a dummy value to be read, and the inserted semaphore update descriptor 304 may cause a first semaphore update (incrementing or writing of the semaphore). This first semaphore update resulting from the inserted semaphore update descriptor 304 can indicate to the computing engine 112 that the on-chip memory 114 is available for storing the new set of data.

Once the last acknowledgment for the writes to the system memory 106 have been received by the DMA engine 102, a second semaphore update can be performed based on the semaphore update descriptor 308 with the memory barrier in write descriptor queue 110. The second semaphore update may indicate to the computing engine 112 that the set of data has been successfully written to the system memory 106. Thus, the first semaphore update can provide an early semaphore update as compared to the second semaphore update, which can optimize the computing resources more efficiently and improve the system performance.

In some implementations, the first semaphore update and the second semaphore update can be updating the same semaphore location. For example, the first semaphore update may increment the semaphore from 5 to 6, and the second semaphore update may increment the same semaphore from 6 to 7. The computing engine 122 can be programmed to interpret the semaphore values accordingly. In some implementations, the first semaphore update and the second semaphore update can be updating different semaphore locations, and the computing engine 122 can be programmed to check the different semaphores to detect different events.

Figure 4:
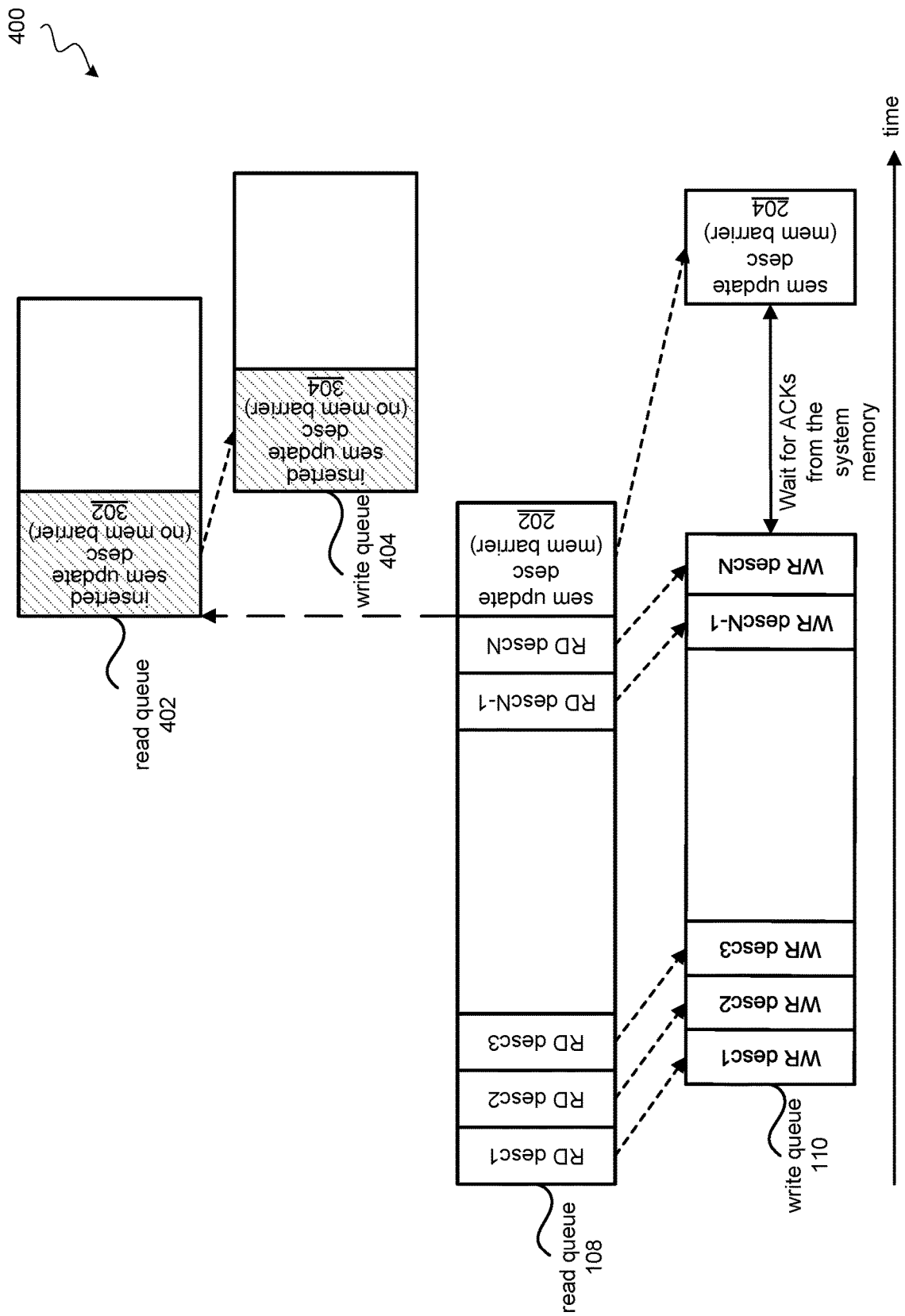
FIG. 4 illustrates a timing diagram of a further example of data transfer operations performed by a DMA engine.

FIG. 4 illustrates a timing diagram 400 of a further example of data transfer operations performed by the DMA engine 102. In the implementation of FIG. 4, the semaphore update descriptors without a memory barrier can be inserted and stored in a separate queue, which can be triggered by a tail pointer increment once the last data element of the set of data has been read out from the system memory 114 based on the last read descriptor RD descN. As shown in FIG. 4, the inserted semaphore update descriptor 302 can be placed in a separate read descriptor queue 402 and the inserted semaphore update descriptor 304 can be placed in a separate write descriptor queue 404. Note that, in some implementations, the DMA engine 102 may include multiple read/write descriptor queue pairs to transfer data, and read descriptor queue 402 and write descriptor queue 404 can be configured as dedicated queues for storing inserted semaphore update descriptors for the different data transfer read/write descriptor queue pairs (which are not shown here for ease of discussion).

In the implementation of FIG. 4, once the last data element of the set of data has been read out from the on-chip memory 114 (RD descN has been processed), the tail pointer increment can point to read descriptor queue 402 to trigger the execution of read descriptor queue 402 (and its corresponding write descriptor queue 404). This causes the inserted semaphore update descriptor 302 in read descriptor queue 402 to be processed to obtain a value for the first semaphore update, which in turn causes the inserted semaphore update descriptor 304 in write descriptor queue 404 to be processed to perform the first semaphore update. This first semaphore update indicates to the computing engine 112 that the on-chip memory 114 is available for storing the new set of data.

Execution of the semaphore update descriptors 202 and 204 are similar to that of FIG. 2, and thus need not be repeated. These semaphore update descriptors 202 and 204 cause a second semaphore update to indicate to the computing engine 112 that the set of data has been successfully written to the system memory 106. By placing the inserted semaphore update descriptors in a separate descriptor queue pair, the first semaphore update need not wait until all the write descriptors of the data transfer have been processed. This may allow the first semaphore update to occur sooner, for example, in instances where the write descriptor queue 110 is unable to process the write descriptors fast enough due to congestion or other latencies.

Figure 5:
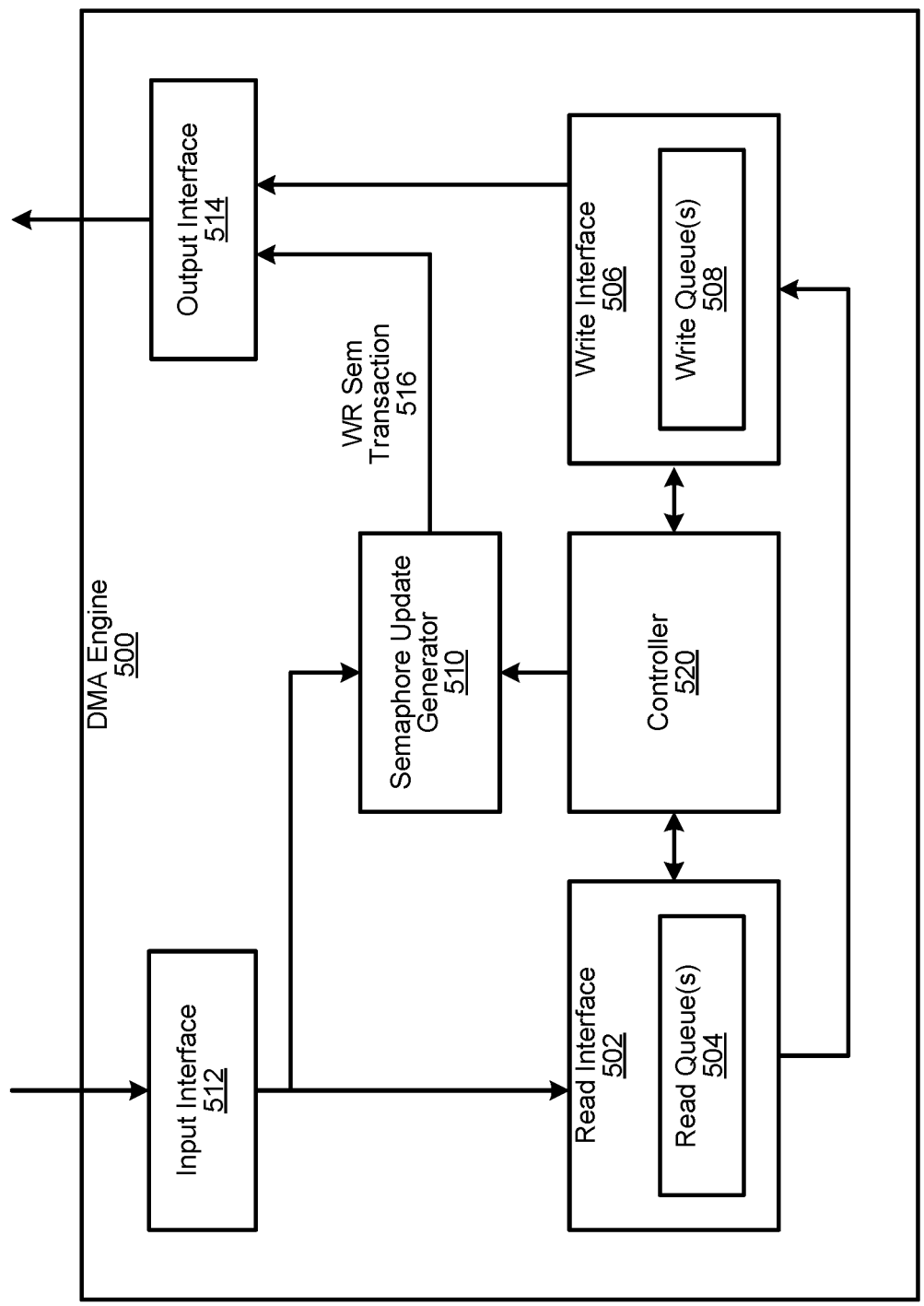
FIG. 5 illustrates a block diagram of an example of a DMA engine.

FIG. 5 illustrates an example of a DMA engine 500, which is an integrated circuit device that is operable to perform data transfers. In some implementations, DMA engine 500 can be an example of DMA engine 102. DMA engine 500 may include a controller 520, a read interface 502, a write interface 506, a semaphore update generator 510, an input interface 512, and an output interface 514. The read interface 502 may include a read descriptor queue 504 and the write interface 506 may include a write descriptor queue 508. The read descriptor queue 504 may be an example of the read descriptor queue 108 and the write descriptor queue 508 may be an example of the write descriptor queue 110.

Input interface 512 and output interface 514 may include suitable interfaces to communicate with the IC device 104 and the system memory 106 via one or more interconnects. For example, the DMA engine 500 may read a set of data from the on-chip memory 114 using the input interface 512. The set of data read from the on-chip memory 114 may be stored in a data buffer (not shown) by the read interface 502. The set of data can be obtained from the data buffer using the write interface 506, and be written to the system memory 106 using the output interface 514.

Controller 520 can be used to manage the operations of DMA engine 500. For example, controller 470 may maintain head and tail pointers for read/write descriptor queues of DMA engine 500. Controller 470 may monitor the number of available entries in a descriptor queue to prevent queue overflow. In some implementations, controller 470 may also maintain completion statuses and generate interrupts for components of the computing system. Controller 470 may process the descriptors in read descriptor queue 504 by reading data from the source designated in the descriptor via input interface 512, and process the descriptors in write descriptor queue 508 by writing the data to a target destination designated in the descriptor via output interface 514. As such, input interface 512 may issue read operations to obtain the data being transferred, and output interface 514 may issue write operations to place the data into the target destination.

In DMA engine 500, the inserted semaphore update can be performed using the semaphore update generator 510. The semaphore update generator 510 is operable to insert a semaphore write transaction 516 to update the semaphore to indicate to the computing engine 112 that the on-chip memory 114 is available to store the new set of data. The semaphore update generator 510 may include an integrated circuit configured to generate the semaphore write transaction 516 based on a determination that the last data element of the set of data has been read out from the on-chip memory 114. The semaphore update generator 510 may determine that the last data element of the set of data has been read out from the on-chip memory 114 based on a response for the last read received from the on-chip memory 114. For example, semaphore update generator 510 may snoop for an address of the last read descriptor RD descN, and wait for a response corresponding to the read using that address. The address or other suitable information used by semaphore update generator 510 to identify the last read can be configured by controller 520.

As shown in FIG. 5, the semaphore write transaction 516 can be inserted at the output interface 514, and thus can bypass the queues of DMA engine 500. This may allow the semaphore update to be performed with the least latency because the semaphore update can avoid any queue processing congestion and/or queue management latencies. The output interface 514 may also include a selection circuit (e.g., a multiplexer) to select between transmitting the inserted semaphore write transaction 516 or the write transactions from write descriptor queue 508. In some implementations, the inserted semaphore write transaction 516 can be given higher priority than other write transactions.

In some implementations, DMA engine 500 may include a configuration register, which may be configured by system software to select a specific implementation for inserting the semaphore update without memory barrier. For example, the semaphore update generator 510 can be disabled to allow semaphore update descriptors to be inserted into the read and write descriptor queues, or DMA engine 500 can be configured to provide a dedicated descriptor queue pair for performing inserted semaphore updates for various data transfer read/write descriptor queues.

Figure 6:
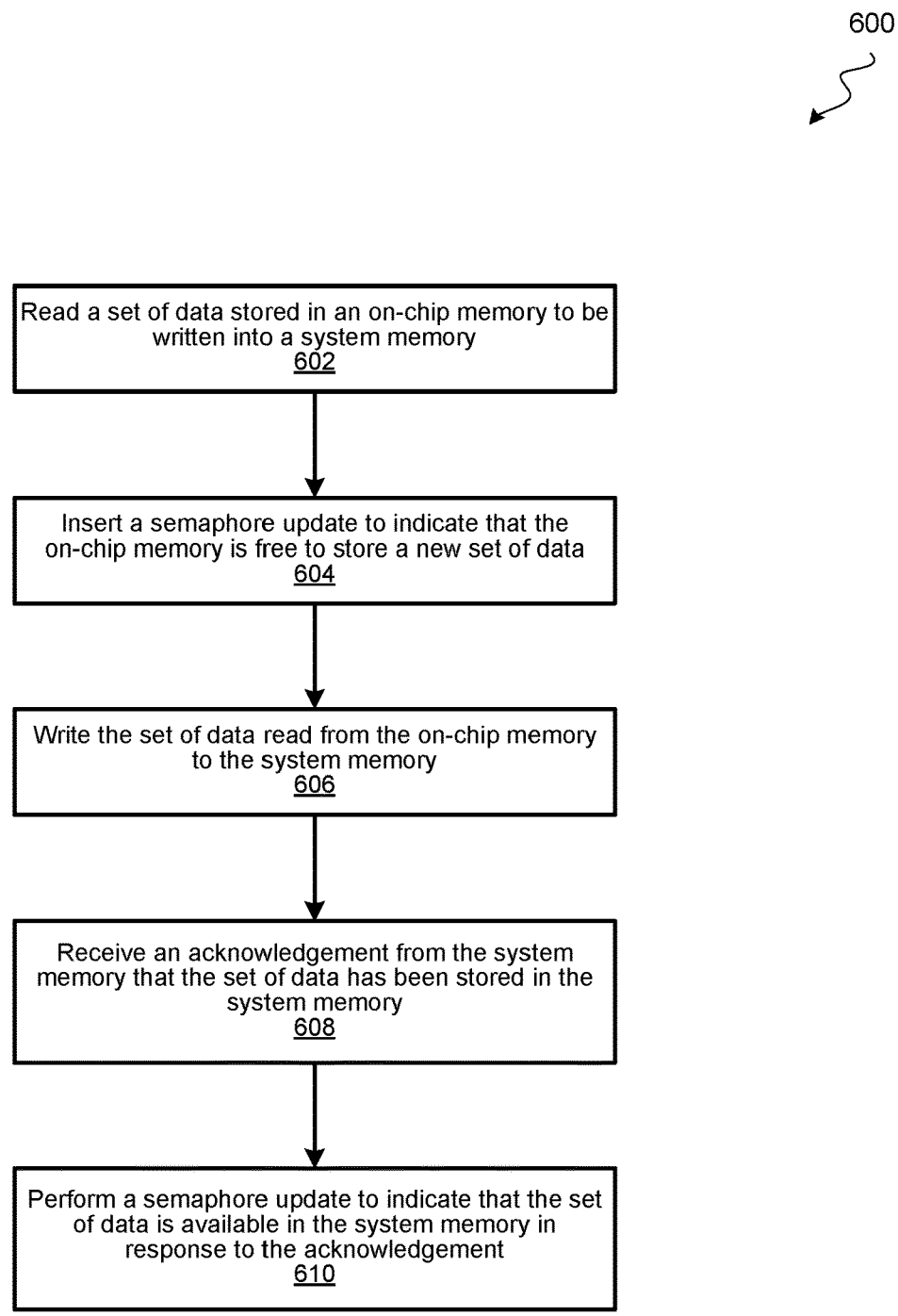
FIG. 6 illustrates a flow chart of an example of a process executable by a DMA engine.

FIG. 6 illustrates an example of a flow chart for a process 600 executable by a DMA engine to generate an early semaphore update. The DMA engine can be, for example, DMA engine 102 or the DMA engine 500. Process 600 can also be performed by other suitable integrated circuit devices.

Process 600 may begin at block 602 by reading a set of data stored in an on-chip memory to be written into a system memory. The DMA engine may read the set of data stored in the on-chip memory based on corresponding read descriptors stored in a read descriptor queue. For example, the set of data may include N data elements and the read descriptors may include the N read descriptors as described herein.

At block 604, a first semaphore update can be inserted to indicate that the on-chip memory is free to store a new set of data. The DMA engine may perform a first semaphore update to indicate that the on-chip memory is free to store a new set of data. The first semaphore update can be inserted by inserting a semaphore update descriptor in the write descriptor queue between the last write descriptor of the write descriptors for writing the set of data and a second semaphore update descriptor having the memory barrier. A corresponding semaphore update descriptor can be inserted in the read descriptor queue between the last read descriptor of the read descriptors for reading the set of data. In some implementations, the first semaphore update can be inserted by inserting a semaphore update descriptor in a separate queue which is triggered by a tail pointer increment after processing a last read descriptor of the read descriptors for reading the set of data. The first semaphore update can also be inserted by a semaphore update generator circuit that inserts a semaphore update transaction at an output interface of the DMA engine in response to detecting a last data element of the set of data has been read.

At block 606, the method includes writing the set of data read from the on-chip memory to the system memory. The DMA engine may write the set of data read from the on-chip memory 114 to the system memory 106 using the write interface 506 and the output interface 514 based on corresponding write descriptors stored in the read descriptor queue 504. For example, the set of data may include N data elements and the write descriptors may include the N write descriptors as described herein.

At block 608, an acknowledgement from the system memory is received to indicate that the set of data has been stored in the system memory. The acknowledgement may clear the memory barrier and allow the second semaphore update descriptor having the memory barrier to be executed. At block 610, in response to the acknowledgement, a second semaphore update is performed to indicate that the set of data is available in the system memory. The DMA engine may update the second semaphore based on a semaphore update descriptor with a memory barrier. The second semaphore update may indicate to the computing engine 112 that the set of data is available in the system memory 106 so that appropriate actions can be taken.

Thus, various implementations can be used to optimize the data transfer operations from the on-chip memory to the system memory by causing a first semaphore update without a memory barrier to occur prior to the semaphore update having the memory barrier. The first semaphore update can provide an early semaphore update as compared to the second semaphore update, which can optimize the computing resources more efficiently and improve the system performance.

Figure 7:
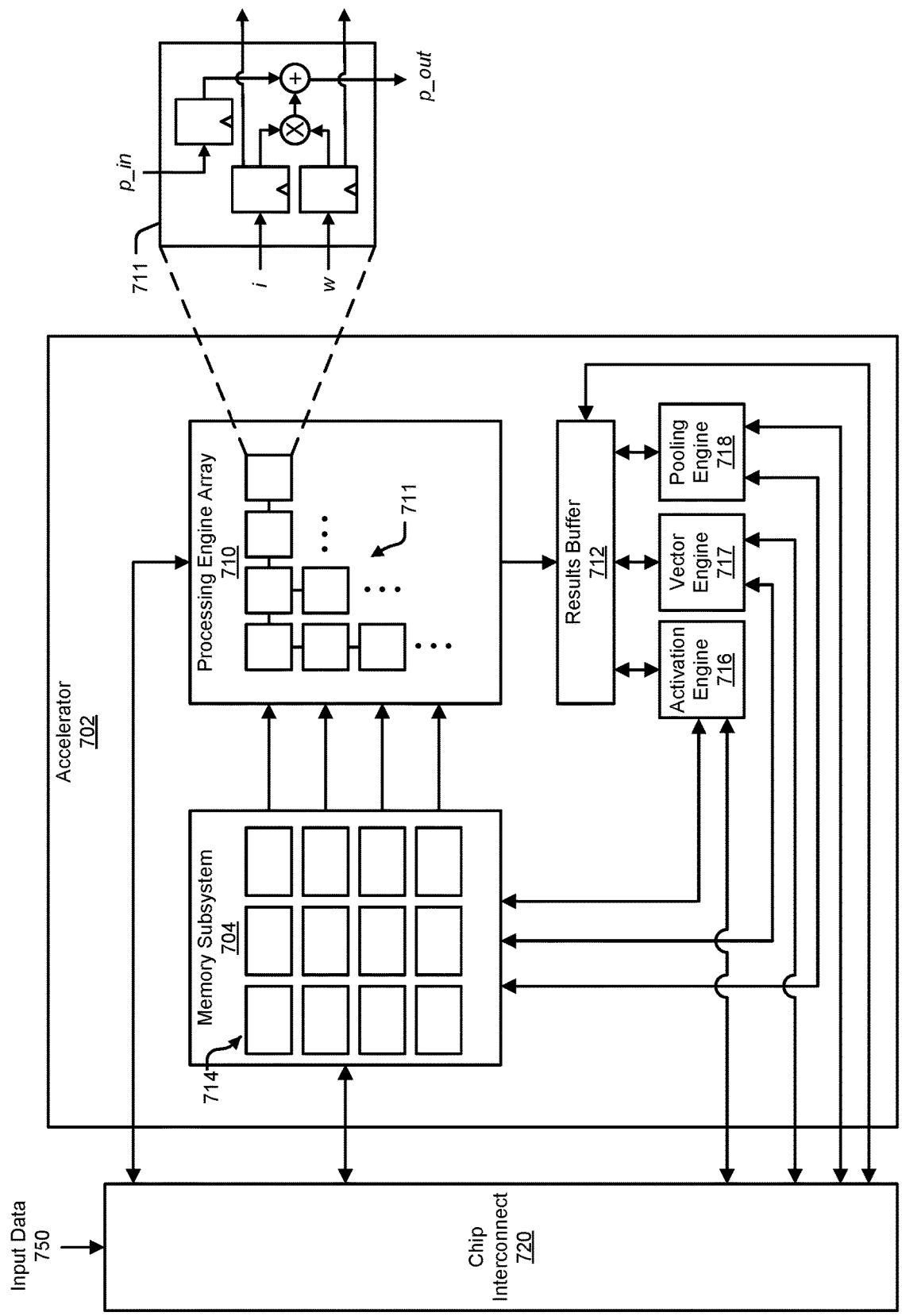
FIG. 7 illustrates a block diagram of an example of an integrated circuit device.

FIG. 7 is a block diagram illustrating an example of an integrated circuit device 104. The example of FIG. 7 illustrates an accelerator 702. In various examples, the accelerator 702, for a set of input data (e.g., input data 750), can execute computations using a processing engine array 710, an activation engine 716, a vector engine 717, and/or a pooling engine 718. Any of these computing engines can be an example of computing engine 112. In some examples, the example accelerator 702 may be an integrated circuit component of a processor, such as a neural network processor. The processor may have other integrated circuit components, including additional accelerator engines.

In various implementations, the memory subsystem 704 can include multiple memory banks 714. Memory subsystem 704 may also be referred to as a state buffer, and can be an example of on-chip memory 114. In these implementations, each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 be independently accessible can increase the efficiency of the accelerator 702. For example, values can be simultaneously read and provided to each row of the processing engine array 710, so that the entire processing engine array 710 can be in use in one clock cycle. As another example, the memory banks 714 can be read at the same time that results computed by the processing engine array 710 are written to the memory subsystem 704. In contrast, a single memory may be able to service only one read or write at a time. With a single memory, multiple clock cycles can be required, for example, to read input data for each row of the processing engine array 710 before the processing engine array 710 can be started.

In various implementations, the memory subsystem 704 can be configured to simultaneously service multiple clients, including the processing engine array 710, the activation engine 716, the vector engine 717, the pooling engine 718, and any external clients that access the memory subsystem 704 over a communication fabric 720. In some implementations, being able to service multiple clients can mean that the memory subsystem 704 has at least as many memory banks as there are clients. In some cases, each row of the processing engine array 710 can count as a separate client. In some cases, each column of the processing engine array 710 can output a result, such that each column can count as a separate write client. In some cases, output from the processing engine array 710 can be written into the memory banks 714 that can then subsequently provide input data for the processing engine array 710. As another example, the activation engine 716, the vector engine 717, and the pooling engine 718 can include multiple execution channels, each of which can be separate memory clients. The memory banks 714 can be implemented, for example, using static random access memory (SRAM).

In various implementations, the memory subsystem 704 can include control logic. The control logic can, for example, keep track of the address spaces of each of the memory banks 714, identify memory banks 714 to read from or write to, and/or move data between the memory banks 714. In some implementations, memory banks 714 can be hardwired to particular clients. For example, a set of memory banks 714 can be hardwired to provide values to the rows of the processing engine array 710, with one memory bank servicing each row. As another example, a set of memory banks can be hard wired to receive values from columns of the processing engine array 710, with one memory bank receiving data for each column.

The processing engine array 710 is the computation matrix of the example accelerator 702. The processing engine array 710 can, for example, execute parallel integration, convolution, correlation, and/or matrix multiplication, among other things. The processing engine array 710 includes multiple processing engines 711, arranged in rows and columns, such that results output by one processing engine 711 can be input directly into another processing engine 711. Processing engines 711 that are not on the outside edges of the processing engine array 710 thus can receive data to operate on from other processing engines 711, rather than from the memory subsystem 704.

In various examples, the processing engine array 710 uses systolic execution, in which data arrives at each processing engine 711 from different directions at regular intervals. In some examples, input data can flow into the processing engine array 710 from the left and weight values can be loaded at the top. In some examples weights and input data can flow from the left and partial sums can flow from top to bottom. In these and other examples, a multiply-and-accumulate operation moves through the processing engine array 710 as a diagonal wave front, with data moving to the right and down across the array. Control signals can be input at the left at the same time as weights, and can flow across and down along with the computation.

In various implementations, the number of columns in the processing engine array 710 determines the computational capacity of the processing engine array 710, and the number of rows determines the required memory bandwidth for achieving maximum utilization of the processing engine array 710. The processing engine array 710 can have, for example, 64 columns and 128 rows, or some other number of columns and/or rows.

An example of a processing engine 711 is illustrated in FIG. 7 in an inset diagram. As illustrated by this example, a processing engine 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 711.

In the illustrated example, an input from above can include a partial sum, pin, provided either from another processing engine 711 or from a previous round of computation by the processing engine array 710. When starting a computation for a new set of input data, the top row of the processing engine array 710 can receive a fixed value for p_in, such as zero. As illustrated by this example, i and w are multiplied together and the result is summed with p_in to produce a new partial sum, pout, which can be input into another processing engine 711. Various other implementations of the processing engine 711 are possible.

Outputs from the last row in the processing engine array 710 can be temporarily stored in the results buffer 712. The results can be intermediate results, which can be written to the memory banks 714 to be provided to the processing engine array 710 for additional computation. Alternatively, the results can be final results, which, once written to the memory banks 714 can be read from the memory subsystem 704 over the communication fabric 720, to be output by the system.

In some implementations, the accelerator 702 includes an activation engine 716. In these implementations, the activation engine 716 can combine the results from the processing engine array 710 into one or more output activations. For example, for a convolutional neural network, convolutions from multiple channels can be summed to produce an output activation for a single channel. In other examples, accumulating results from one or more columns in the processing engine array 710 may be needed to produce an output activation for a single node in the neural network. In some examples, activation engine 716 can be bypassed.

In various examples, the activation engine 716 can include multiple separate execution channels. In these examples, the execution channels can correspond to the columns of the processing engine array 710, and can perform an operation on the outputs of a column, the result of which can be stored in the memory subsystem 704. In these examples, the activation engine 716 may be able to perform between 1 and n parallel computations, where n is equal to the number of columns in the processing engine array 710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 702 can include a pooling engine 718. Pooling is the combining of outputs of the columns of the processing engine array 710. Combining can include for example, computing a maximum value, a minimum value, an average value, a median value, a summation, a multiplication, or another logical or mathematical combination. In various examples, the pooling engine 718 can include multiple execution channels that can operating on values from corresponding columns of the processing engine array 710. In these examples, the pooling engine 718 may be able to perform between 1 and n parallel computations, where n is equal to the number of columns in the processing engine array 710. In various examples, execution channels of the pooling engine 718 can operate in parallel and/or simultaneously. In some examples, the pooling engine 718 can be bypassed.

In some implementations, the accelerator 702 can further include a vector engine 717. Vector engine 717 is a compute engine that can perform computations and manipulations on values stored in memory subsystem 704 and/or results buffer 712 such as values representing matrices of input values, weight values, intermediate results, etc. Vector engine 717 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 717 can operate in parallel and/or simultaneously. In some examples, the vector engine 717 can be bypassed or be omitted.

Herein, the activation engine 716, the vector engine 717, and the pooling engine 718 may be referred to collectively as execution engines. The processing engine array 710 is another example of an execution engine. Another example of an execution engine is a Direct Memory Access (DMA) engine, which may be located outside the accelerator 702.

Input data 750 can arrive over the communication fabric 720. The communication fabric 720 can connect the accelerator 702 to other components of a processor, such as a DMA engine that can obtain input data 750 from an Input/Output (I/O) device, a storage drive, or a network interface. The input data 750 can be, for example one-dimensional data, such as a character string or numerical sequence, or two-dimensional data, such as an array of pixel values for an image or frequency and amplitude values over time for an audio signal. In some examples, the input data 750 can be three-dimensional, as may be the case with, for example, the situational information used by a self-driving car or virtual reality data. In some implementations, the memory subsystem 704 can include a separate buffer for the input data 750. In some implementations, the input data 750 can be stored in the memory banks 714 when the accelerator 702 receives the input data 750.

In some examples, the accelerator 702 can implement a neural network processing engine. In these examples, the accelerator 702, for a set of input data 750, can execute a neural network to perform a task for which the neural network was trained. Executing a neural network on a set of input data can be referred to as inference or performing inference.

The weights for the neural network can be stored in the memory subsystem 704, along with input data 750 on which the neural network will operate. The neural network can also include instructions, which can program the processing engine array 710 to perform various computations on the weights and the input data. The instructions can also be stored in the memory subsystem 704, in the memory banks 714 or in a separate instruction buffer. The processing engine array 710 can output intermediate results, which represent the outputs of individual layers of the neural network. In some cases, the activation engine 716, the vector engine 717, and/or pooling engine 718 may be enabled for computations called for by certain layers of the neural network. The accelerator 702 can store the intermediate results in the memory subsystem 704 for inputting into the processing engine array 710 to compute results for the next layer of the neural network. The processing engine array 710 can further output final results from a last layer of the neural network. The final results can be stored in the memory subsystem 704 and then be copied out to host processor memory or to another location.

Figure 8:
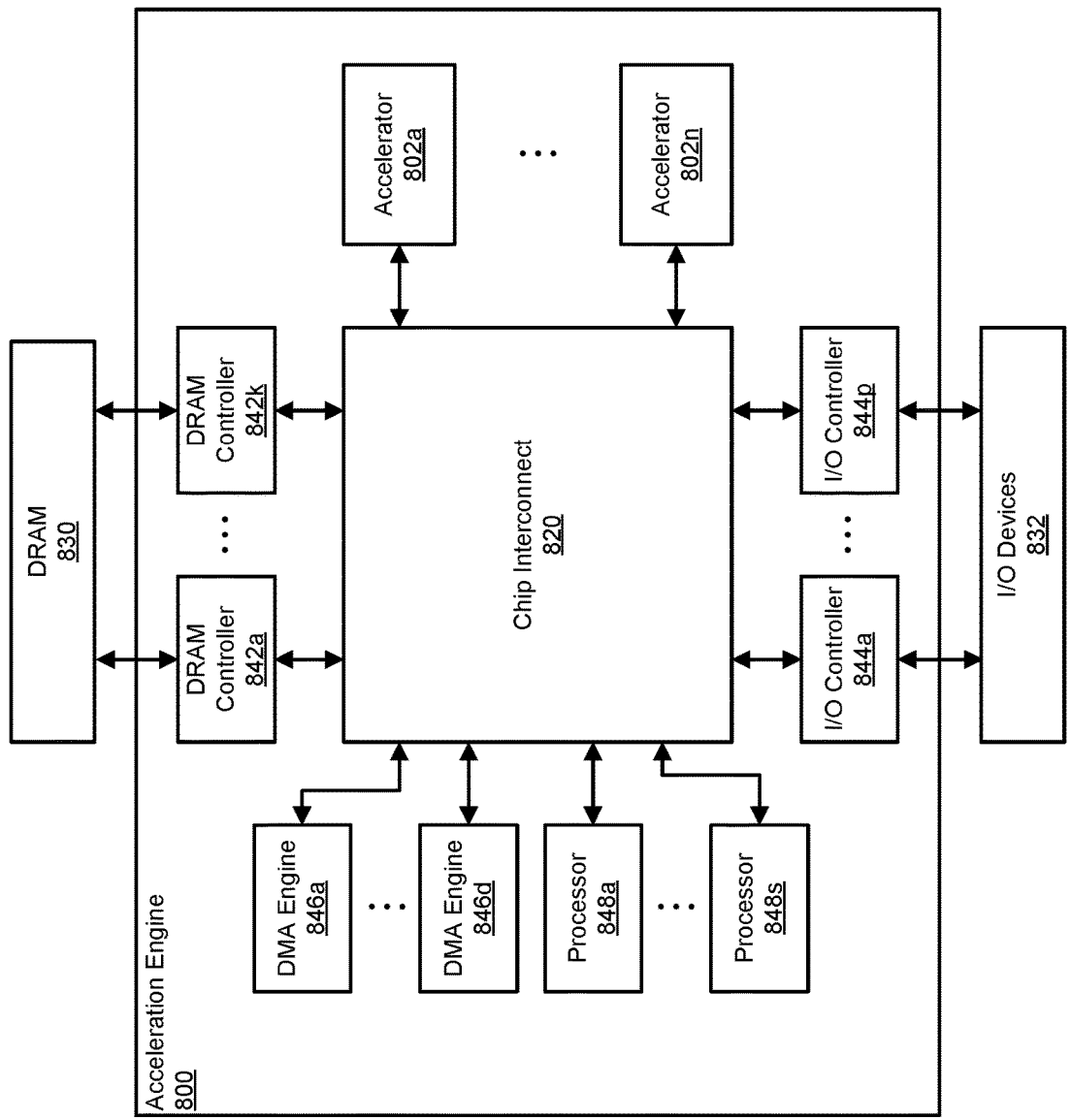
FIG. 8 illustrates a block diagram of an example of an acceleration engine.

FIG. 8 includes a block diagram that illustrates an example of an acceleration engine 800. The acceleration engine 800 is an example of an integrated circuit that can include one or more accelerators 802a-802n that may be similar to the accelerator illustrated in FIG. 7.

In the example of FIG. 8, the acceleration engine 800 includes multiple accelerators 802a-802n, each of which can perform a set of operations. In various examples, the accelerators 802a-802n are for particular types of operations, so that the accelerators 802a-802n can perform the operations much faster than when similar operations are performed by a general-purpose processor. In various examples, to perform a set of operations, input data on which the operations are to be performed must first be moved into the accelerators 802a-802n. Additionally, in some cases, program code is also moved into the accelerators 802a-802n, which programs the operations that the accelerators 802a-802n will perform on the data. In the illustrated example, the acceleration engine 800 includes n accelerators 802a-802n. Examples of accelerators that can be included in the acceleration engine 800 include graphics accelerators, floating point accelerators, neural network accelerators, and others. In various examples, the accelerators 802a-802n can each be the same (e.g., each of the is a graphics accelerator) or can be different (e.g., the accelerators 802a-802n include a graphics accelerator, a floating point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of RAM technology can be used for the external memory. The DRAM controllers 842a-842k can also be referred to as memory controllers.

In various examples, input data and/or program code for the accelerators 802a-802n can be stored in the DRAM 830. Different programs can cause the accelerators 802a-802n to perform different operations. For example, when one of the accelerators is a neural network accelerator, one program can configure the neural network accelerator to perform speech recognition while another program can configure the neural network accelerator to perform image recognition. In various examples, different accelerators 802a-802n can be programmed with different programs, so that each performs a different set of operations. In various examples, the processors 848a-848s can manage moving of program code from the DRAM 830 to the accelerators 802a-802n.

The example acceleration engine 800 further includes I/O controllers 844a-844p for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844p can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes p I/O controllers 844a-844p, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848a-848s, which can also be referred to as data management processors. In the example of FIG. 8, the acceleration engine 800 includes s processors 848a-848s incorporated into the device (e.g., on the same silicon die). In other examples, the processors 848a-848s can be external to the acceleration engine 800 (e.g., on a different die and/or in a different package). In some examples, the processors 848a-848s can manage the movement of data from I/O devices 832 to the accelerators 802a-802n or the DRAM 830. For example, input data may be located at an I/O device 832 or in processor memory, and the processors 848a-848s can move the input from the I/O device 832 or processor memory into an accelerator or into DRAM 830. As another example, program code for the accelerators 802a-802n may be located on an I/O device 832 or in processor memory.

The example acceleration engine 800 further includes DMA engines 846a-846d (e.g., DMA engine 100 or 500) that can move data between the accelerators 802a-802n, DRAM controllers 842a-842k, and I/O controllers 844a-844p. In the illustrated example, the acceleration engine 800 includes d DMA engines 846a-846d. In some implementations, the DMA engines 846a-846d can be assigned to specific tasks, such as moving data from the DRAM controllers 842a-842d to the accelerators 802a-802n, or moving data between the I/O controllers 844a-844p and the accelerators 802a-802n. These tasks can be assigned, for example, by enqueueing descriptors with the DMA engines 846a-846d, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830.

In various examples, each of the processors 848a-848s can be responsible for managing the data movement for a different accelerator. In some examples, a processor may manage the data movement for more than one accelerator. Similarly, in various examples, each of the processors 848a-848s can be assigned to one or more DMA engines 846a-846d. In these and other examples, associations between processors 848a-848s, accelerators 802a-802n, and DMA engines 846a-846d are determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexors to control the direction of data, flip-flops for handling clock domain crossings, and timing logic.

Figure 9:
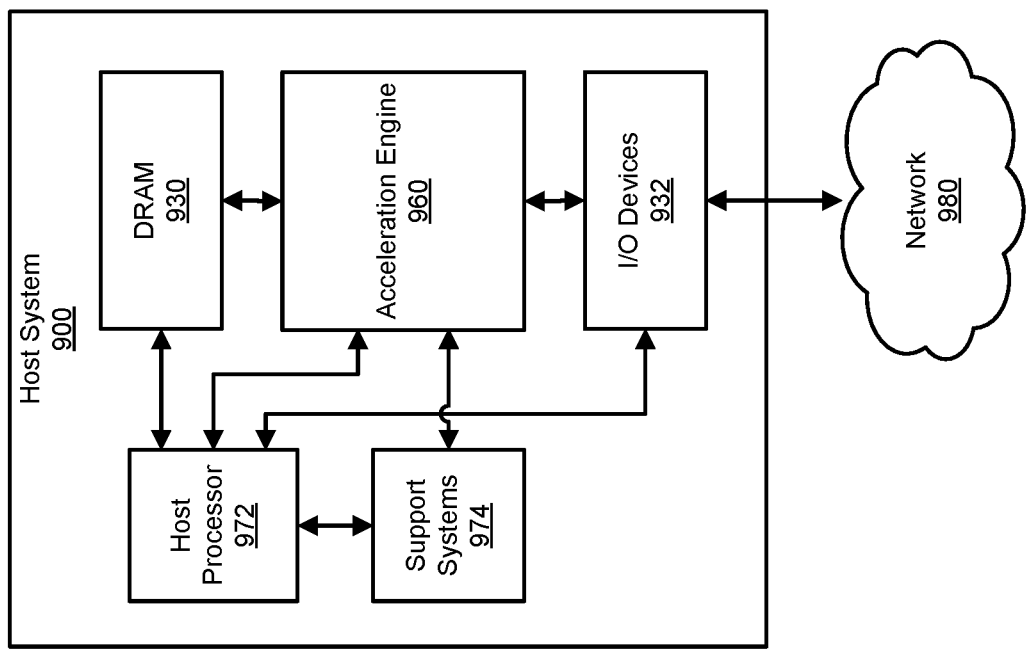
FIG. 9 illustrates a block diagram of an example of a host system.

FIG. 9 includes a block diagram that illustrates an example of a host system 900 in which an acceleration engine 960 can be used. The acceleration engine 960 of FIG. 9 is an example of a device that can include one or more accelerators such as is illustrated in FIG. 8. The example host system 900 of FIG. 9 includes the acceleration engine 960, a host processor 972, DRAM 930 or processor memory, I/O devices 932, and support systems 974. In various implementations, the host system 900 can include other hardware that is not illustrated here.

The host processor 972 is a general-purpose integrated circuit that is capable of executing program instructions. In some examples, the host processor 972 can include multiple processing cores. A multi-core processor may include multiple processing units within the same processor. In some examples, the host system 900 can include more than one host processor 972. In some examples, the host processor 972 and the acceleration engine 960 can be one chip, such as, one or more integrated circuits within the same package.

In various examples, the host processor 972 can communicate with other components in the host system 900 over one or more communication channels. For example, the host system 900 can include a host processor bus, which the host processor 972 can use to communicate with the DRAM 930, for example. As another example, the host system 900 can include an I/O bus, such as a PCI-based bus, over which the host processor 972 can communicate with the acceleration engine 960 and/or the I/O devices 932, for example. In various examples, the host system 900 can, alternatively or additionally, include other communication channels or busses, such as serial busses, power management busses, storage device busses, and so on.

In some examples, software programs executing on the host processor 972 can receive or generate input for processing by the acceleration engine 960. In some examples, the programs can select an appropriate neural network to execute for a given input. For example, a program may be for language translation, and can select one or more neural networks capable of speech recognition and/or machine translation. In these and other examples, the programs can configure the acceleration engine 960 with the neural network to execute, and/or can select a neural network processing engine on the acceleration engine 960 that has previously been configured to execute the desired neural network. In some examples, once the acceleration engine 960 has started an inference on input data, the host processor 972 can manage the movement of data (such as weights, instructions, intermediate results, results of conditional layers, and/or final results) into or out of the acceleration engine 960.

In some examples, a software program that is using the acceleration engine 960 to conduct an inference can read the result from a conditional layer from the acceleration engine 960 and/or from a storage location, such as in DRAM 930. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 930 is memory that is used by the host processor 972 for storage of program code that the host processor 972 is in the process of executing, as well as values that are being operated on. In some examples, the data for a neural network (e.g., weight values, instructions, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a Read-Only Memory (ROM) that stores boot code for booting the host system 900 at power on, and/or Basic Input/Output System (BIOS) code.

Though not illustrated here, the DRAM 930 can store instructions for various programs, which can be loaded into and be executed by the host processor 972. For example, the DRAM 930 can be storing instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controller peripheral devices, among other operations. In some examples, a host system 900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system, and/or application programs and peripheral devices accessible to the host system 900. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices. The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 974 can include hardware for coordinating the operations of the acceleration engine 960. For example, the support systems 974 can include a microprocessor that coordinates the activities of the acceleration engine 960, including moving data around on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 972. In some examples, the program executed by the microprocessor is stored on the hardware of microprocessor, or on a non-volatile memory chip in the host system 900. In some examples, the microprocessor and the acceleration engine 960 can be on chip, such as one integrated circuit on the same die and in the same package.

In some examples, the support systems 974 can be responsible for taking instructions from the host processor 972 when programs executing on the host processor 972 request the execution of a neural network. For example, the host processor 972 can provide the support systems 974 with a set of input data and a task that is to be performed on the set of input data. In this example, the support systems 974 can identify a neural network that can perform the task, and can program the acceleration engine 960 to execute the neural network on the set of input data. In some examples, the support systems 974 only needs to select an appropriate neural network processing engine of the neural network processor. In some examples, the support systems 974 may need to load the data for the neural network onto the acceleration engine 960 before the acceleration engine 960 can start executing the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
    system memory operable to:
        store a set of data; and
        generate a respective acknowledgement to indicate that a corresponding set of data has been stored in the system memory;
    an integrated circuit device including:
        an acceleration circuit;
        an on-chip memory; and
        a semaphore that is written to control operation of the acceleration circuit; and
    a direct memory access (DMA) engine including:
        a read descriptor queue operable to store read descriptors;
        a write descriptor queue operable to store write descriptors; and
        a controller operable to:
            process the read descriptors to obtain the set of data from the on-chip memory for storage into the system memory;
            insert a first semaphore update without a memory barrier in a processing flow of the DMA engine to indicate that the on-chip memory is free to store a new set of data before the set of data has been completely written into the system memory;
            process the write descriptors to write the set of data into the system memory;
            receive an acknowledgement from the system memory that the set of data has been stored in the system memory; and
            perform a second semaphore update with a memory barrier to indicate that the set of data is available in the system memory in response to the acknowledgement.

2. The system of claim 1, wherein the first semaphore update is inserted by inserting a first semaphore update descriptor in the write descriptor queue between a last write descriptor of the write descriptors for writing the set of data and a second semaphore update descriptor corresponding to the second semaphore update.

3. The system of claim 1, wherein the first semaphore update is inserted by inserting a first semaphore update descriptor in a separate queue which is triggered by a tail pointer increment after processing a last read descriptor of the read descriptors for reading the set of data.

4. The system of claim 1, wherein the DMA engine includes a semaphore update generator circuit, and wherein the first semaphore update is inserted by configuring the semaphore update generator circuit to insert a semaphore update transaction at an output interface of the DMA engine in response to detecting that a last data element of the set of data has been read.

5. A computer-implemented method comprising:
    reading a set of data stored in an on-chip memory of an integrated circuit device to be written into a system memory;
    inserting a first semaphore update in a processing flow of the integrated circuit device to indicate that the on-chip memory is free to store a new set of data;
    writing the set of data read from the on-chip memory to the system memory;
    receiving an acknowledgement from the system memory that the set of data has been stored in the system memory; and in response to the acknowledgement, performing a second semaphore update to indicate that the set of data is available in the system memory.

6. The computer-implemented method of claim 5, wherein the first semaphore update is performed by a direct memory access (DMA) engine based on a first semaphore update descriptor without a memory barrier, and the second semaphore update is performed by the DMA engine based on a second semaphore update descriptor with a memory barrier.

7. The computer-implemented method of claim 6, wherein reading the set of data stored in the on-chip memory is performed by the DMA engine based on a set of read descriptors stored in a read descriptor queue, and wherein writing the set of data to the system memory is performed based on a set of write descriptors in a write descriptor queue.

8. The computer-implemented method of claim 7, wherein inserting the first semaphore update includes inserting the first semaphore update descriptor in the write descriptor queue between a last write descriptor of the set of write descriptors for writing the set of data and the second semaphore update descriptor.

9. The computer-implemented method of claim 7, wherein inserting the first semaphore update includes inserting the first semaphore update descriptor in a separate queue which is triggered by a tail pointer increment after processing a last read descriptor of the set of read descriptors for reading the set of data.

10. The computer-implemented method of claim 5, wherein the first semaphore update is inserted by a semaphore update generator circuit in a DMA engine, the semaphore update generator circuit inserting a semaphore update transaction at an output interface of the DMA engine in response to detecting a last data element of the set of data has been read.

11. The computer-implemented method of claim 10, wherein the semaphore update generator circuit determines that the last data element of the set of data has been read out from the on-chip memory based on snooping an address associated with a last read descriptor on an input interface.

12. The computer-implemented method of claim 5, wherein the first semaphore update and the second semaphore update increment a same semaphore location in the integrated circuit device.

13. The computer-implemented method of claim 5, wherein the first semaphore update and the second semaphore update increment different semaphore locations in the integrated circuit device.

14. The computer-implemented method of claim 13, wherein the integrated circuit device is a neural network processor, and the on-chip memory is a state buffer of the neural network processor.

15. The computer-implemented method of claim 14, wherein the set of data includes weight values or feature map values associated with a neural network model.

16. A direct memory access (DMA) engine comprising:
a read descriptor queue operable to store read descriptors;
a write descriptor queue operable to store write descriptors;
an input interface operable to read data based on the read descriptors;
an output interface operable to write data based on the write descriptors; and
a controller operable to:
process the read descriptors to obtain a set of data from an on-chip memory of an integrated circuit device;
insert a first semaphore update in a processing flow of the DMA engine to indicate that the on-chip memory is free to store a new set of data;
process the write descriptors to write the set of data read from the on-chip memory to system memory;
receive an acknowledgement from the system memory that the set of data has been stored in the system memory; and
perform a second semaphore update to indicate that the set of data is available in the system memory in response to the acknowledgement.

17. The DMA engine of claim 16, wherein the first semaphore update is inserted by processing a first semaphore update descriptor placed in the write descriptor queue between a last write descriptor of the write descriptors for writing the set of data and a second semaphore update descriptor corresponding to the second semaphore update.

18. The DMA engine of claim 16, wherein the first semaphore update is inserted by processing a first semaphore update descriptor in a separate queue which is triggered by a tail pointer increment after processing a last read descriptor of the read descriptors for reading the set of data.

19. The DMA engine of claim 16, further comprising:
a semaphore update generator circuit,
wherein the first semaphore update is inserted by configuring the semaphore update generator circuit to insert a semaphore update transaction at the output interface in response to detecting that a last data element of the set of data has been read.

20. The DMA engine of claim 16, wherein the first semaphore update and the second semaphore update increment a same semaphore location.

* * * * *